Dec. 4, 1923.　　　　　　　　　　　　　　　　1,476,479
N. ALLEN
AUTOMATIC TILE CUTTING TABLE
Filed July 25, 1921　　　5 Sheets-Sheet 1

Fig. 1

Inventor
Neal Allen
By Thorpe Gerard
Attorneys

Witness:
R. E. Hamilton

Dec. 4, 1923.  1,476,479
N. ALLEN
AUTOMATIC TILE CUTTING TABLE
Filed July 25, 1921   5 Sheets-Sheet 2

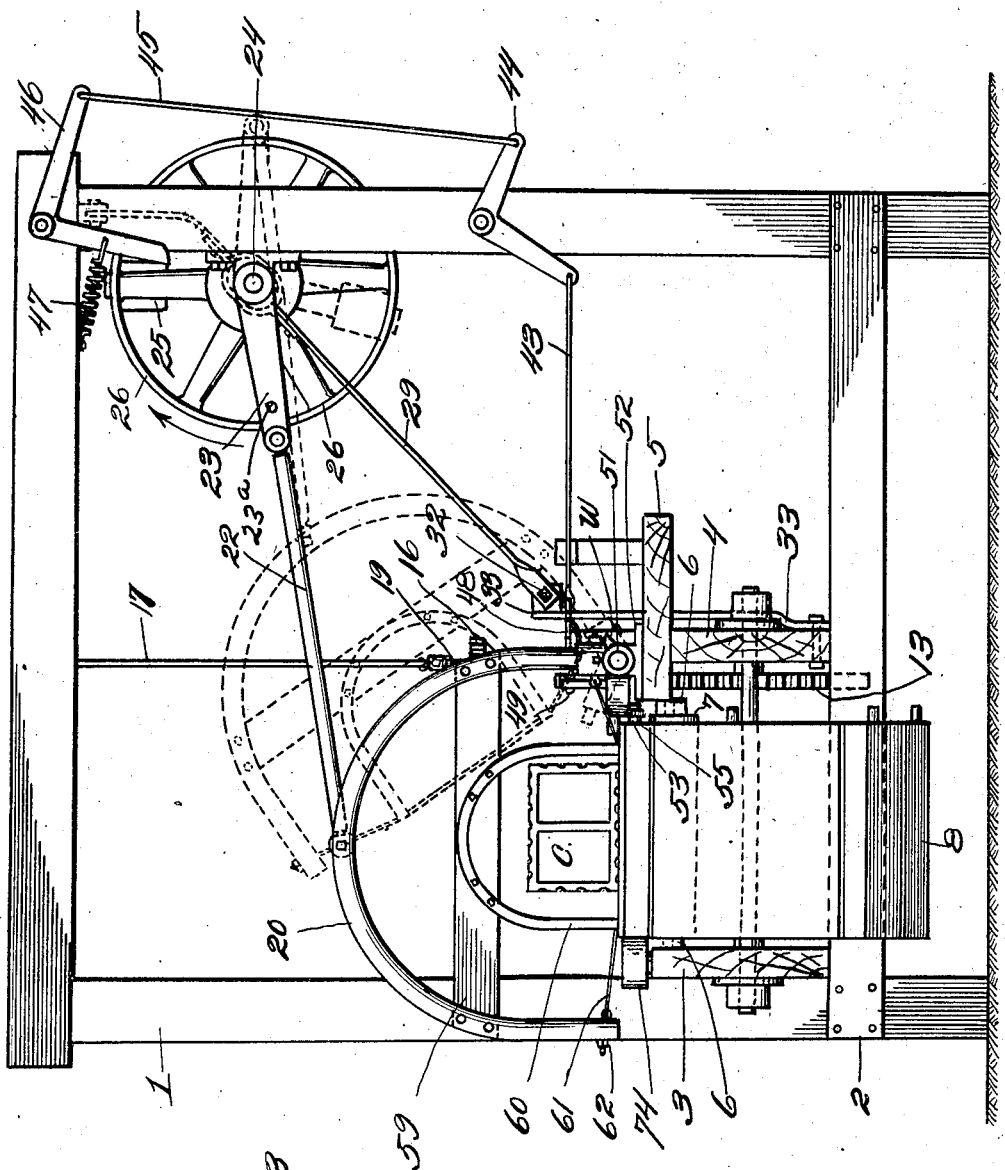

Dec. 4, 1923.
N. ALLEN
AUTOMATIC TILE CUTTING TABLE
Filed July 25, 1921
1,476,479
5 Sheets-Sheet 4
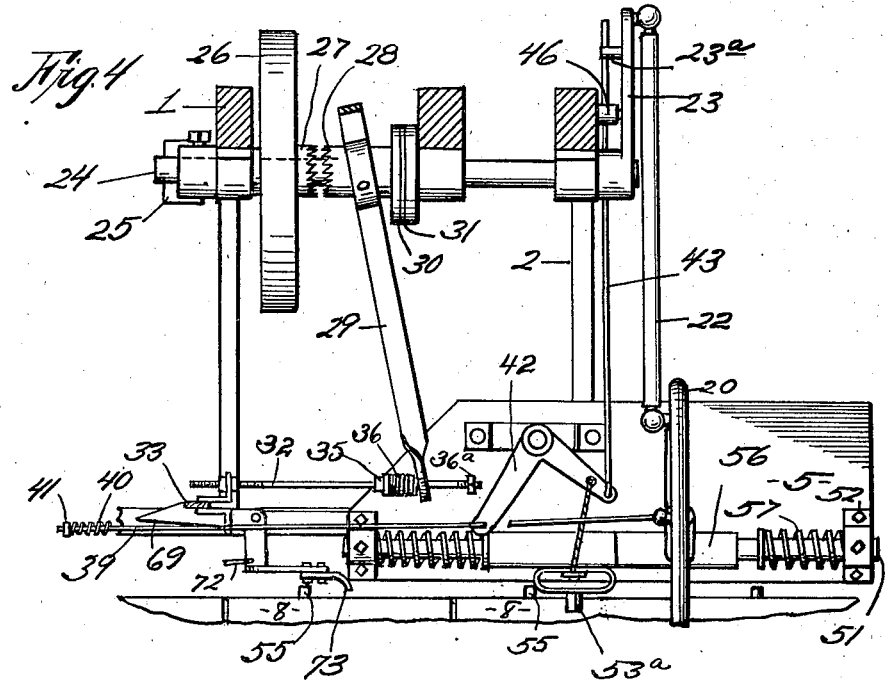
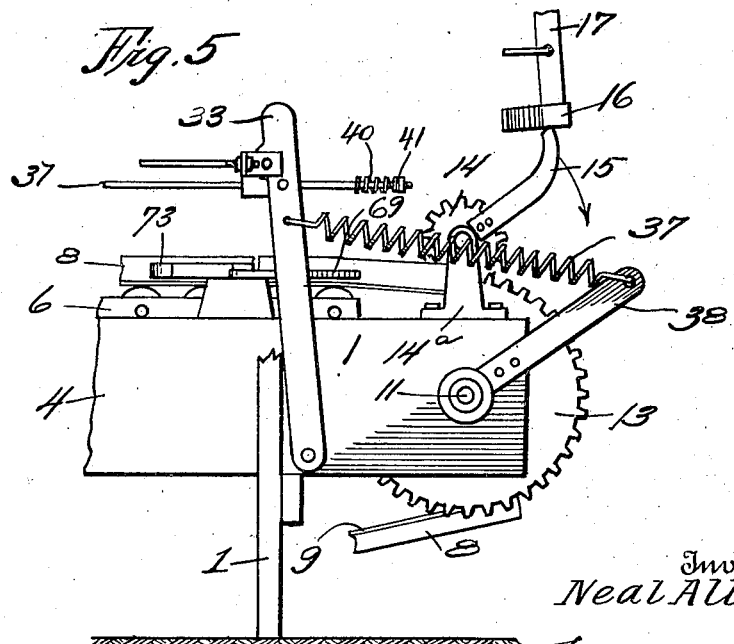
Witness:
R. E. Hamilton.
Inventor
Neal Allen.
By Thorpe & Girard
Attorneys

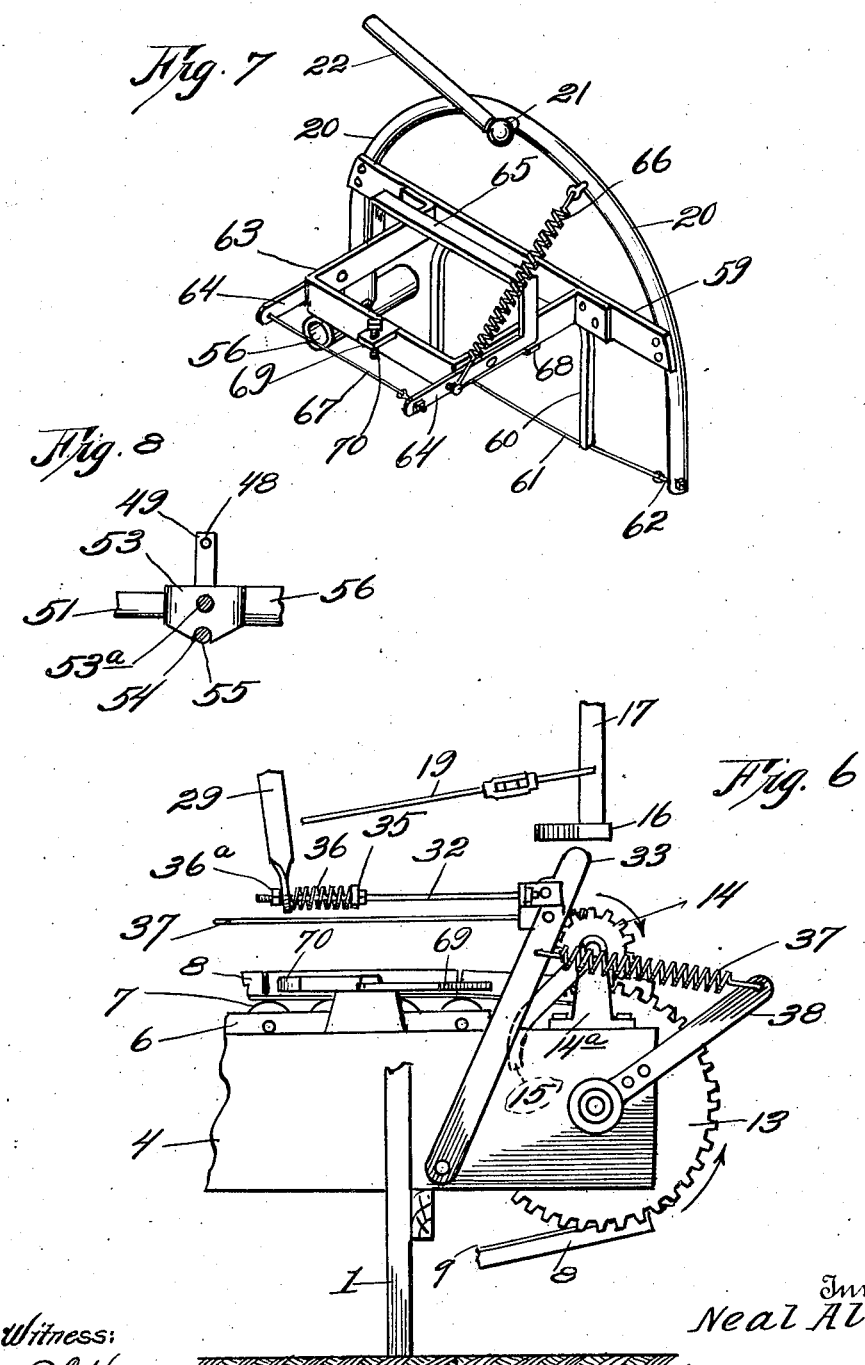

Patented Dec. 4, 1923.

1,476,479

UNITED STATES PATENT OFFICE.

NEAL ALLEN, OF PITTSBURG, KANSAS, ASSIGNOR OF TWO-THIRDS TO J. F. DENISON, OF COFFEYVILLE, KANSAS.

AUTOMATIC TILE-CUTTING TABLE.

Application filed July 25, 1921. Serial No. 487,336.

*To all whom it may concern:*

Be it known that I, NEAL ALLEN, a citizen of the United States, residing at Pittsburg, in the county of Crawford and State of Kansas, have invented a certain new and useful Improvement in Automatic Tile-Cutting Tables, of which the following is a complete specification.

This invention relates to automatic tile cutting tables of that class in which a continuously-moving raw tile column is cut into tiles of equal length, and my object is to produce means for cutting the column without distortion thereof and with the ends of the completed tiles comparatively clean-cut and smooth.

A further object is to produce cutting mechanism of which the cutting element enters the column at one corner thereof where it is easiest to start the cut, and progresses toward the diagonally-opposite corner, so that the column shall offer the greatest resistance to distortion in any direction during the full stroke of the cutter.

A further object is to provide means for efficiently and cleanly cutting the column into tile lengths at any speed at which it may be desired to produce the column.

A still further object is to produce a construction in which the movement of the column is utilized to impart corresponding movement to the cutter without interfering with the cutting and withdrawal strokes of the latter transversely of the tile.

With these general objects in view, the invention consists in certain novel and useful features of construction and combinations of parts as hereinafter described and claimed; and in order that the invention may be fully understood, reference is to be had to the accompanying drawings, in which:—

Figure 1 is a side view of an automatic tile cutting table embodying the invention, the near side of the frame-work being omitted to disclose parts otherwise hidden.

Figure 2 is a top plan view of the machine with parts of the frame-work in section.

Figure 3 is a front end view of the machine.

Figure 4 is a fragmentary top plan view of the machine with the parts in position to be set in operation by the tile-impelled table.

Figure 5 is a fragmentary side view of the mechanism shown by Figure 4.

Figure 6 is a view similar to Figure 5, but with the parts in the position shown by Figure 1.

Figure 7 is a detailed perspective view of the cutting mechanism.

Figure 8 is a side view of the locking device for periodically securing the cutting mechanism to travel forwardly with the table.

In the said drawings where like reference characters identify corresponding parts in all of the figures, 1 indicates a suitable frame-work having horizontal members 2 as a support for the sides 3 and 4 of the conveyor or table proper, and certain other mechanism as will hereinafter appear, a shelf 5 for part of such mechanism being mounted upon the side 4. Secured to the inner face of side member 3 and to the shelf 5, or otherwise are bearing strips 6, for the spindles of a series of rollers 7 over which runs the endless table or conveyor, the same being preferably composed of a plurality of sections 8 corresponding in length with the tile to be made, and flexible bands or aprons 9.

The endless table or conveyor is mounted at its ends upon a pair of tri-armed spiders 10, the same being secured on transverse shafts 11 journaled in the sides 3 and 4 of the table frame-work. There are two spiders on each shaft and the extremities of their arms are connected by cross rods 12, the arrangement being such that the distance between adjacent cross rods corresponds to the length of the sections 8 so that such rods shall successively engage the bands or aprons 9 coincidental with the contiguous edges of adjacent sections 8, and it will be noted by reference to Figure 1, that the rollers 7 form a stable anti-friction support for the upper strand of the table for nearly the full length thereof, in order to provide the proper resistance when the tile column is cut into lengths by cutting mechanism hereinafter described.

The tile column C is formed by a die in the usual or any preferred manner, and as it emerges from the die, not shown, by which it is molded and fed forward, it engages and rests upon the upper strand of and imparts movement to the endless table in the direction indicated by the arrow, Figure 1, the table through its engagement with the spiders, causing the same to rotate.

Secured upon the rearmost shaft 11, is a large gear wheel 13 meshing with a gear-pinion 14 journaled on a stub shaft of a bracket 14ª mounted upon the table frame-work, as shown most clearly by Figure 5, and rigidly secured to the gear pinion is an arm 15 adapted once in each revolution of the pinion, to engage the forked end 16 of and rock the arm 17 suspended from a bracket 18 secured to the frame-work 1. The swinging arm 17 is connected pivotally by a link 19 to a cutter frame 20 for imparting rearward movement to said frame, that is movement in a direction parallel but opposite to the travel of the top of the table, and the cutter frame has a ball-and-socket connection at 21 with a link 22 having a ball-and-socket connection at its opposite end with a crank arm 23 of a transverse shaft 24. The shaft is equipped with a weighted arm 25, for a purpose which hereinafter appears.

A belt wheel 26 is journaled on the shaft 24 and is equipped with a clutch member 27 for engagement at times by a clutch member 28 slidably keyed on shaft 24, and to effect disengagement and re-engagement of said clutch members, a lever 29 is connected in the conventional manner to the slidable clutch member and is pivoted as shown or in any other suitable manner to the frame-work 1. The slidable clutch member is provided with a friction disc or flange 30 at one end adapted for engagement with the leather-faced stationary disc 31, for the purpose of instantly checking rotation of the shaft 24 under certain conditions, as hereinafter explained.

A link 32 is pivotally connected to a lever 33 fulcrumed as at 34 on the table frame-work, and said link extends slidingly through the free end of lever 29 and carries between said lever and lever 33, a collar 35 and a coil spring 36, the latter being interposed between the collar 35 and lever 29 to act as a cushion under certain conditions, it being noted that a nut 36ª engages the link at the opposite side of lever 29 from the cushion 36.

A retractile spring 37 connects lever 33 with a fixed arm 38 for the purpose of holding said lever when unresisted, at the rearward limit of its movement. A rod 39 extends slidingly through an ear of lever 33 and a spiral spring or cushion 40 interposed between said ear and a retaining nut or collar 41 on the rear end of said rod, the front end of the latter being pivotally connected to a horizontal bell-crank lever 42 mounted on the shelf 5. The opposite end of said lever is connected by a link 43 with one arm of a vertically arranged bell-crank 44 mounted on the frame-work. The opposite arm of the bell-crank 44 is connected by a link 45 with another bell-crank lever 46 mounted on the frame-work and connected thereto by a retractile spring 47, the action of said spring being to hold the bell-crank 46 in the path of a pin 23ª projecting from the crank-arm 23.

A cable 48 connects one of the first-named bell-crank levers to an arm 49 projecting upward from a sleeve 50 mounted slidingly and rockingly on a rod 51 extending parallel with and adjacent the table and secured in supporting brackets 52. The sleeve 50 is also equipped with a locking device 53 provided with a double bevel or V-shaped lower edge or catch (see Figure 8) formed at the apex with a notch 54 for engagement by pins 55 projecting from the side of the table sections, such engagement locking the sleeve 50 to the table so that it shall move with the latter a predetermined distance and then be tripped from such engagement by a pull applied by the cable 48, as hereinafter more particularly referred to. When not engaged with one of said pins the locking device is held in the path of the pins by a roller 53ª carried by the catch and resting upon the table.

The cutter frame 20 is secured at one end to an arm of a sleeve 56 mounted slidingly and rockingly on the rod 51 and interposed between the sleeve 50 and a cushioning spring 57 surrounding the rod for cushioning the forward movement of the said frame when such movement is about completed. A cushion spring 58 is also interposed between the rear bracket 52 and the sleeve 50 for cushioning the rearward or return movement of said sleeve and the frame 20, as hereinafter more particularly described.

Referring now to the cutting frame, which in its preferred form, is of substantially inverted U-shape, it will be noted by reference particularly to Figure 7 that the arms of the frame are spanned by a cross piece 59 as a support for a smaller inverted U-frame 60 formed with notches at the lower ends of its legs for the retention of the cutting wire 61, and said wire is secured at its ends to take-up screws 62 mounted in the extremities of the frame 20.

It is sometimes desirable to score or partially cut some of the tile to facilitate breakage thereof, and to accomplish this in a simple and practical manner, a substantially horizontal frame 63 is secured at its end to the cross piece 59, and pivoted to opposite sides of said frame is a pair of arms 64 united by a yoke 65. A retractile spring 66 connects said yoke arms to the frame 20 and normally holds the arms in horizontal position so that the scoring wire 67 connecting the extremities of said arms shall occupy an inoperative position, that is, a position sufficiently high that it cannot come in contact with the tile column when the cutting wire 61 is performing its cutting or withdrawal function. A stop lug 68 projecting from frame 63 limits the movement imparted to said yoke arms by the retractile spring 66, and it will be noted that the spring is so connected to said yoke arms that when the operator grasps and swings the yoke arms to a vertical position, the spring is so positioned that it will hold the arms in such position that the wire 67 shall perform a scoring function about half-way through the tile column, that is make a score to approximately half the depth of the tile column, as any tile so scored may be readily broken. In order that the depth of the scoring may be varied, however, the frame 63 is provided with a lug 69 carrying an adjustable stop screw 70 against which the yoke 65 impinges when swung downward to dispose the scoring wire 67 in operative position.

When the lever 33 is swung forward by the pressure applied by the pin 23$^a$ of crank arm 23 on the bell-crank lever 46, it engages the bevelled-catch end of a bell-crank shaped trigger 71 held in its path by the action of a retractile spring 72 and as it passes said bevelled end, said spring causes the trigger to engage and hold the lever in its forward position, which position it retains until one of the pins 55 engages a finger 73 projecting from the trigger and trips the latter from engagement with said lever, which action occurs at that period in the travel of the tile column when the frame 20 has been swung upwardly and completely withdrawn its cutting wire from the column. The instant after such action occurs, the retractile spring 37 returns said lever to its initial position and effects the reengagement of the slidable clutch member with the stationary clutch member, this action being instantly followed, of course, by a turning movement of the shaft 24.

To prevent side play or movement of the top portion of the table when a pin engages and trips the trigger, a pair of rollers 74 mounted on the frame-work, engage the edge of the said top portion at the opposite side thereof from the trigger. This insures retention of the locked relation between the table and the locking device and the proper advance of the cutter by the table.

Operation.

Assuming the machine is at rest with the belt wheel 26 idling and the cutter at the rearward limit of its movement, it will be seen that as the tile column is started forward from the "die," it imparts corresponding travel to the "table" or conveyor on which it rests forward of the "die." This movement of the "table," through one of its pins 55, trips the trigger and at the same instant another further-advanced pin 55 enters the notch 54 of the locking device 53 and thereby transmits power from the table to the sleeve 56 and causes the "cutter" to move forward with the table and tile column, and through the link 19, swing arm 17 forward.

At the instant the trigger is tripped and the locking device interlocks with the table as above explained, the retractile spring 37 swings lever 33 rearward and thereby causes the clutch-lever 29 to swing rearward to throw the shaft in gear with the driven belt-pulley; slackens cable 48 to permit of unimpeded travel forward of the locking device, and permits spring 47 to dispose bell-crank 46 in position to be operated by crank-arm pin 23$^a$.

The engagement of the clutch-members 27—28 is of course instantly followed by rotative movement of the shaft 24 in the direction indicated by the arrow, Figure 3, to cause the "cutter" while moving forward with the table, to swing from the position shown in dotted lines to the completed cutting position shown by full lines, and back again, the cutter in this action entering the space between adjacent sections of the table and withdrawing therefrom. In the first three-fourths of the revolution of the said shaft, the cutter, while traveling with the column, severs the latter and withdraws completely therefrom, thereby completing a tile, T, it being noted that the ball-and-socket connection between the crank-arm 22 and cutter frame accommodates said elements in their constantly changing relative positions.

At the end of the three-fourths revolution, the crank-arm pin 23$^a$, strikes and operates bell-crank 46, and through the connections between the same and arm 33, swings the latter forward to engage and be so retained by the trigger. The forward movement of the arm 33, through rod 32, operates lever 29 to disengage the clutch-members, but the shaft under the momentum acquired by the weighted arm 25, continues to turn until it completes the revolution and by such time the disc 30 engages and is arrested by the friction disc 31, the cushion 36 maintaining the discs in frictional engagement should any lost-motion or play exist between the arm 33 and the trigger. It will thus be seen that as the shaft completes its revolution, the weighted arm 25 is extending downward and thereby cooperates with the weighted arm W on sleeve 56, in holding the "cutter" in the dotted line position until after it has been drawn rearward to its initial position. It will be understood that this rearward movement of the "cutter" immediately follows its withdrawal from the tile to said dotted position, and is effected by the arm 15 turning with the pinion, said arm entering the fork 16 and swinging arm 17 rearward its full distance and releasing it as the locking device and trigger are respectively engaged by the following pins of the table, to effect a repetition of the operations described for the completion of another tile. Each tile thus produced, is discharged from the front end of the table upon a delivery table forming the subject-matter of another application filed concurrently herewith, Serial No. 487,337, or such tiles as completed, may be lifted by hand or otherwise removed from the cutting table, it being noted, however, that the latter is so arranged that the section 8 carrying the completed tile, inclines downwardly and forwardly slightly (see Figure 1) as the cut is completed, to facilitate the withdrawal of the cutting wire without contact with the rear end of the tile, thereby avoiding abrasion thereof.

It will be noted also that when the power shaft, through the crank-pin 23ª operating on the bell-crank 46, swings the lever 33 forward, the cable 48 is drawn taut to raise the locking device from engagement with the table pin, and that when the cutter is drawn back to its initial position, the cable is slackened to permit of gravitative relocking engagement of the locking device with a pin of the table.

From the above description and drawings it will be apparent that I have produced an automatic tile cutting table embodying the features of advantage set forth as desirable in the statement of the objects of the invention, and it will be obvious that the invention is susceptible of modification in various particulars without departing from the principle of construction and mode of operation involved or from the spirit and scope of the appended claims.

I claim:

1. In a machine of the character described, the combination of a table supporting and moving at the same speed as a tile column, a cutter supported to slide alongside and parallel with the tile column, and adapted for oscillation, means to interlock the cutter to the table to cause advance sliding movement of the former, a swing arm, means actuated by the advance movement of the cutter, to operate said swing arm, a shaft, a drive wheel journaled thereon, clutch mechanism, a spring-retracted lever to effect engagement of the clutch mechanism and thereby interlock said wheel and shaft to rotate the latter, a crank arm on said shaft, connections to cause the crank arm to rock the cutter down through the tile column and reverse such action during the advance of the cutter, connections actuated by said crank arm for unlocking the cutter from the table and for advancing said lever to disengage said clutch mechanism, means for operating the swing arm to slide the cutter back to its initial position, means for locking the lever in its advanced position until after the cutter has attained its initial position, and means whereby the table shall unlock the lever to permit it to effect reengagement of said clutch mechanism.

2. In a machine of the character described, a table for supporting and actuated to travel by and in the same direction and at the same speed as a tile column, a shaft revolved by the table, an arm rotated by the power of the said shaft, a rod extending parallel with the tile column, a cutter slidably and rotatably mounted on said rod, a driven wheel, a second shaft, on which said wheel is journaled, a clutch member rigid with said wheel, a clutch member slidable on and rotatable with said second shaft, a spring actuated lever and connections to effect engagement of said clutch members, to cause rotation of said second shaft, means to transmit power from said second shaft to rotatably operate the cutter down through the tile column and reverse such operation, means actuated by the same shaft to cause the cutter to travel forward with and at the same speed as the tile column without affecting the rotary operation of the cutter, and means actuated by said rotary arm to slidably withdraw the cutter after it has been disconnected from the tile.

3. In a machine of the character described, a table for supporting and actuated to travel by and in the same direction and at the same speed as a tile column, a shaft revolved by the table, an arm rotated by the power of the said shaft, a rod extending parallel with the tile column, a cutter slidably and rotatably mounted on said rod, a driven wheel, a second shaft, on which said wheel is journaled, a clutch member rigid with said wheel, a clutch member slidable on and rotatable with said second shaft, a spring actuated lever and connections to effect engagement of said clutch members, to cause rotation of said second shaft, means to transmit power from said second shaft to rotatably operate the cutter down through the tile column and reverse such operation, means actuated by the same shaft to cause the cutter to travel forward with and at the same speed as the tile column without affecting the rotary operation of the cutter, means actuated by said rotary arm to slidably withdraw the cutter after it has been disconnected from the tile, and spring cushions at opposite ends of the cutter to cushion its advance and retrograde sliding movements.

4. The combination with a traveling table having laterally-projecting pins, of a slidable cutter, and a gravity locking device for engaging such pins successively and transmitting power therefrom to cause the cutter to advance with the table.

5. The combination with a traveling table having laterally-projecting pins, of a slidable cutter, a gravity locking device for engaging such pins successively and transmitting power therefrom to cause the cutter to advance with the table, and means to trip said locking device to arrest such movement of the cutter.

6. The combination with a traveling table having laterally-projecting pins, of a slidable cutter, a gravity locking device for engaging such pins successively and transmitting power therefrom to cause the cutter to advance with the table, means to cause the cutter when moving with the table, to swing downward over the table and in the reverse direction to its original position, and means to trip the locking device to arrest the advance travel of the cutter.

7. A cutter comprising a frame having a cutting wire, connected pivoted arms carried by said frame, a scoring wire connecting said arms, and yielding means for holding said arms with the scoring wire in or above an operative position with relation to said cutting wire.

In witness whereof I hereunto affix my signature.

NEAL ALLEN.